(12) United States Patent
Ismert et al.

(10) Patent No.: US 10,786,761 B2
(45) Date of Patent: Sep. 29, 2020

(54) BASKET-STYLE SOLIDS INTERCEPTOR

(71) Applicant: Striem LLC, Kansas City, KS (US)

(72) Inventors: Vincent Ismert, Kansas City, MO (US); Gabe Ismert, Kansas City, MO (US); Rusty Shaver, Tonganoxie, KS (US); Montgomery Jones, Kansas City, MO (US); Matthew Keen, Belton, MO (US)

(73) Assignee: Striem LLC, Kansas City, KS (US)

( * ) Notice: Subject to any disclaimer, the term of this patent is extended or adjusted under 35 U.S.C. 154(b) by 0 days.

(21) Appl. No.: 16/256,581

(22) Filed: Jan. 24, 2019

(65) Prior Publication Data
US 2020/0238200 A1 Jul. 30, 2020

(51) Int. Cl.
| | | |
|---|---|---|
| *E03C 1/264* | (2006.01) | |
| *B01D 29/35* | (2006.01) | |
| *B01D 21/00* | (2006.01) | |
| *B01D 29/00* | (2006.01) | |
| *B01D 35/30* | (2006.01) | |
| *B01D 35/027* | (2006.01) | |

(52) U.S. Cl.
CPC ..... *B01D 21/0012* (2013.01); *B01D 21/0033* (2013.01); *B01D 29/0004* (2013.01); *B01D 29/0018* (2013.01); *B01D 29/35* (2013.01); *B01D 35/027* (2013.01); *B01D 35/30* (2013.01); *E03C 1/264* (2013.01); *B01D 2201/0407* (2013.01); *B01D 2201/10* (2013.01); *B01D 2201/302* (2013.01); *B01D 2201/307* (2013.01); *B01D 2201/605* (2013.01)

(58) Field of Classification Search
CPC .... B01D 29/0043; B01D 29/23; B01D 29/35; B01D 35/027; B01D 35/0276; B01D 35/30; B01D 2201/30; B01D 2201/307; E03C 1/264
USPC ............... 210/162, 435, 459, 460, 461, 470
See application file for complete search history.

(56) References Cited

U.S. PATENT DOCUMENTS

| | | | | |
|---|---|---|---|---|
| 4,059,519 A | * | 11/1977 | Zieg ...................... | B01D 35/02 210/470 |
| 5,554,277 A | * | 9/1996 | Rief ..................... | B01D 29/117 210/456 |

(Continued)

OTHER PUBLICATIONS

Striem AardvarkTM Basket-Style Solids Interceptor Email Launch, Feb. 4, 2018, 1 page.

(Continued)

*Primary Examiner* — Christopher Upton
(74) *Attorney, Agent, or Firm* — Hovey Williams LLP

(57) ABSTRACT

An improved solids interceptor and methods of using the same. The solids interceptor includes a tank having an inlet and at least one outlet, and an access opening on an upper end of the tank. A perforated basket is removably received within the tank via the access opening. When the basket is installed within the tank, wastewater entering the tank via the inlet flows into the basket, with the solid waste being collected in the basket and the liquid waste flowing out of the basket via the perforated screen. The basket and tank include an interlocking flange assembly that automatically axially aligns a basket inlet with an inlet pipe simply by inserting the basket into the tank. The basket is removable from the tank to easily clean out and discard solid waste accumulated in the basket.

15 Claims, 11 Drawing Sheets

(56) References Cited

U.S. PATENT DOCUMENTS

| | | | | |
|---|---|---|---|---|
| 6,592,756 | B1* | 7/2003 | Felix, Jr. | B01D 29/23 |
| | | | | 210/470 |
| 6,602,408 | B1* | 8/2003 | Berkey | B01D 35/027 |
| | | | | 210/470 |
| 7,128,832 | B2* | 10/2006 | Wade | B01D 29/23 |
| | | | | 210/162 |
| 7,144,506 | B2* | 12/2006 | Lombardi, II | E03F 11/00 |
| | | | | 210/532.2 |
| 8,245,852 | B2* | 8/2012 | Sloan | F04D 9/02 |
| | | | | 210/435 |
| 2013/0146525 | A1* | 6/2013 | Parcell | B01D 29/35 |
| | | | | 210/348 |

OTHER PUBLICATIONS

HLT/B Series: under counter solids interceptors ,and USI Series: under counter solids interceptors, Striem Catalog, 2016, p. 12, www.striemco.com.

* cited by examiner

BASKET-STYLE SOLIDS INTERCEPTOR

TECHNICAL FIELD

The present invention generally relates to a solids interceptor. More particularly, aspects of the invention relate to a solids interceptor including a removable basket for collecting and accumulating solid waste provided in wastewater.

BACKGROUND OF THE INVENTION

Solids interceptors (also known as solids collectors) are used in a wide array of commercial facilities in which solids pose a threat to the proper functioning of the facility's drainage system. These include, among others, laundry facilities, commercial kitchens, pet washing facilities and kennels, art room sinks at educational institutions, barber shops and hair salons, and food processing facilities.

Generally, solids interceptors are installed along the facility's drain line to separate solid waste from the facility's wastewater before the wastewater is piped to a disposal site such as a septic tank or a sewer system. The solid waste remains trapped within the interceptor while the liquid waste flows through the interceptor and continues to the disposal site.

Known solid interceptors may employ a vertical screen or the like placed within a tank, which in turn is installed along the drain line of a commercial plumbing system. Solids-laden wastewater enters the tank and is forced through the screen such that the solid waste therein—such as, for example, lint, food waste, hair, plaster, paint, among others—is caught by the screen and ultimately settles on a bottom of the tank. The liquid waste that passes through the screen then continues to the disposal site. Collecting the solid waste in the interceptor prevents clogs and other damage to the facility's drainage system and reduces the amount of solid waste flowing to water treatment facilities.

However, these screens or the like used to separate the solid waste from the wastewater are known to become dislodged or damaged, allowing solids to pass by the screen and thus to the disposal site. This results in clogging or other damage to the drainage system and can lead to solid waste undesirably settling in a septic tank or entering a municipalities' water treatment system. Moreover, because by design solid waste collects and builds up within the tank of the solids interceptor, it is necessary to periodically access the tank to remove the solid waste therefrom. Because solid interceptors are often installed underground, this can be a difficult task that requires specialized equipment to vacuum out or otherwise remove the collected solids below grade. For example, some solid interceptors include a withdrawal pipe or the like that extends vertically from the bottom of tank to near or above the surface. To remove the solid waste from the tank, a high-powered vacuum is connected to the pipe to draw the solid waste therethrough. However, the solid waste can be clogged within the withdrawal pipe itself, requiring further maintenance and repair. Moreover, such systems make visual inspection of the interior of the tank nearly impossible, and thus it is unknown whether all solid waste has been removed from the tank.

Known interceptors include only one outlet provided near the top of the tank; i.e., provided at the same elevation as the inlet. This results in a large volume of water being retained within the tank because the static water level is maintained very near the top of the tank. This is undesirable for applications where large amounts of wastewater will be flushed or drained at once, because the tank does not have much unused volume to absorb the deluge of wastewater, causing the drainage system to back up. In such applications, it would be more desirable for the static water level to be near the bottom of the tank such that the tank has adequate capacity to absorb large amounts of wastewater being flushed or drained at once. Still more, by only providing a single outlet, known solids interceptors are relatively inflexible in that existing drain lines may need to be rerouted or otherwise reconfigured to couple with the fixed inlet and outlet provided on the tank. It would thus be more desirable for a solids interceptor to have multiple outlets such that the appropriate outlet can be selected depending on the drainage system architecture and specific application.

There is thus a need for an improved solids interceptor that can effectively separately solids from wastewater in a variety of applications and installations. There is a further need for a solids interceptor that is easily accessed and emptied as solid waste collects within a tank of the solids interceptor.

SUMMARY OF THE INVENTION

Embodiments of the present invention are directed to an improved solids interceptor capable of use in a variety of applications and installations. Other embodiments of the present invention are directed to an improved solids interceptor that is easily accessible for cleaning out solid waste collected therein. Still other embodiments of the present invention are directed to a method of separating solid waste from wastewater using such solids interceptors and a method of installing such solid interceptors along a facility's drain line.

More particularly, aspects of the present invention are directed to a solids interceptor for separating solid waste from wastewater. In some embodiments, the solid interceptor includes a tank having an inlet on an upstream end of the tank and an outlet on a downstream end of the tank. The tank includes an access opening on an upper end of the tank, and a basket is removably received within the tank via the access opening. The basket includes an upper frame member and an opposing lower frame member, with a perforated screen extending between the upper frame member and the lower frame member. When the basket is installed within the tank, wastewater entering the tank via the inlet flows into the basket, with the solid waste being collected in the basket and the liquid waste flowing out of the basket via the perforated screen. The liquid waste leaving the basket can then exit the tank via the outlet. In some embodiments, the tank includes an inlet pipe extending downstream from the inlet, and the basket further comprises a vertical frame member including a basket inlet. Simply placing the basket within the tank axially aligns the basket inlet with inlet pipe. In other embodiments, the tank includes a second outlet, a sewer gas trap, and a watertight cap, with the sewer gas trap and watertight cap being removably coupled to the first and second outlets, respectively.

Other aspects are directed to a method of separating solid waste from wastewater using such a solids interceptor. The solids interceptor is placed along a drain line such that wastewater exiting the facility is routed through the tank and thus the basket, with the solid waste accumulating in the basket. In some embodiments, the method includes removing the basket from the tank to empty accumulated solid waste therefrom, and then replacing the basket in the tank. In other embodiments, the method includes removably coupling the sewer gas trap to one of the two outlets while removably coupling the watertight cap to the other of the two outlets.

Other aspects of the present invention are directed to a method if installing such a solids interceptor along a facility's drain line. The method includes fluidly coupling the inlet to a drain pipe leaving a facility, and coupling a selected one of the two outlets to a drain pipe leading to a disposal site. The sewer gas trap is removably coupled to the selected one of the two outlets while the watertight cap is removably coupled to the other of the two outlets. In some embodiments, the solids interceptor is buried below grade, and thus a riser is coupled to an upper end of the tank and extends from the tank to the ground level. In other embodiments, a handle is removably coupled to the basket and may be cut to length such that the handle extends from the basket and near an open upper end of the riser.

Additional advantages and features of the present invention will be set forth in part in a description which follows, and in part will become apparent to those skilled in the art upon examination of the following or may be learned from practice of the invention.

BRIEF DESCRIPTION OF THE DRAWINGS

The present invention is described in detail below with reference to the attached drawing figures, in which like numerals represent the same components, and wherein.

DETAILED DESCRIPTION

Figure 1:
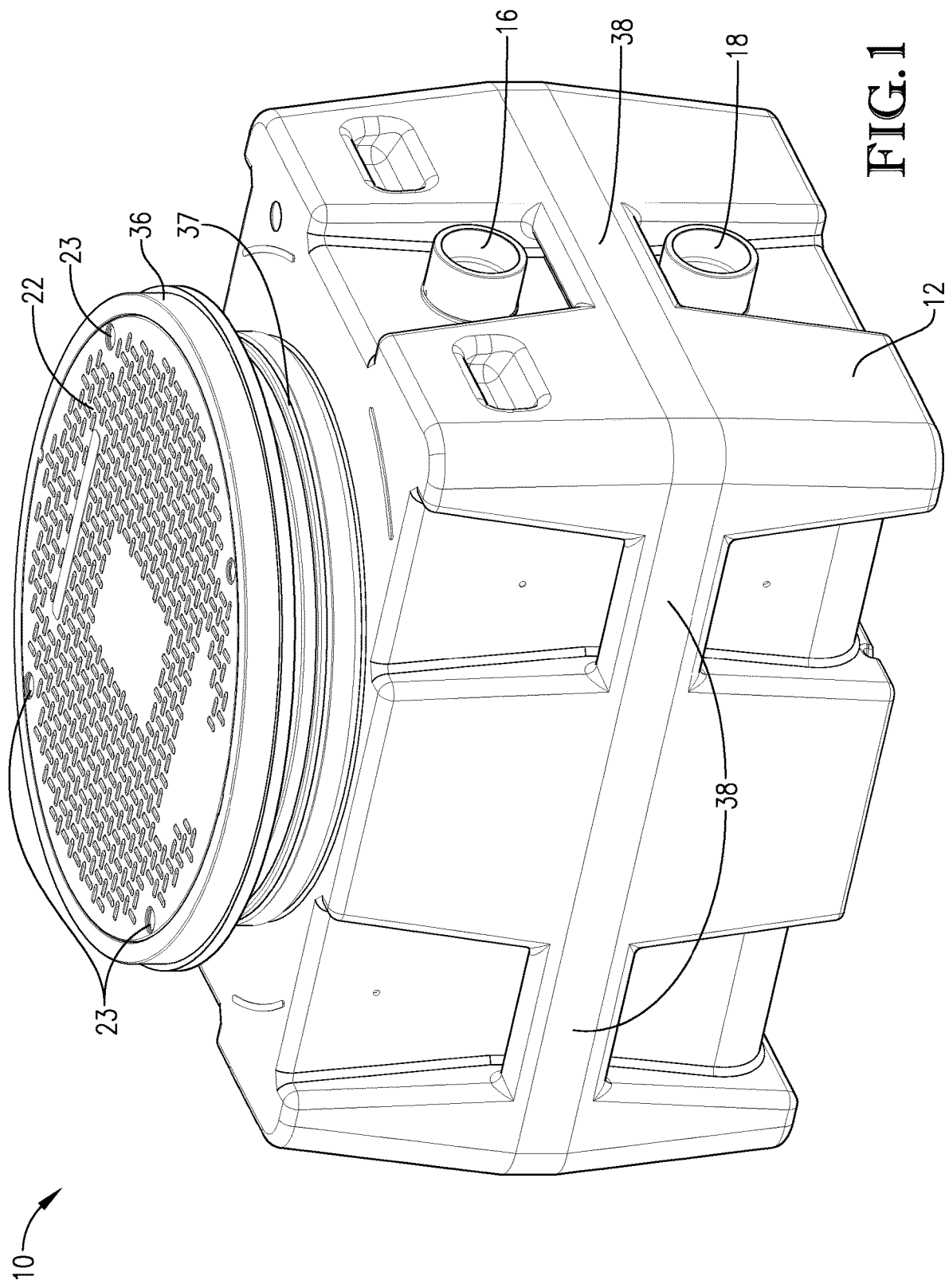
FIG. 1 is a top-right-front perspective view of a solids interceptor according to one embodiment of the invention.
Figure 2:
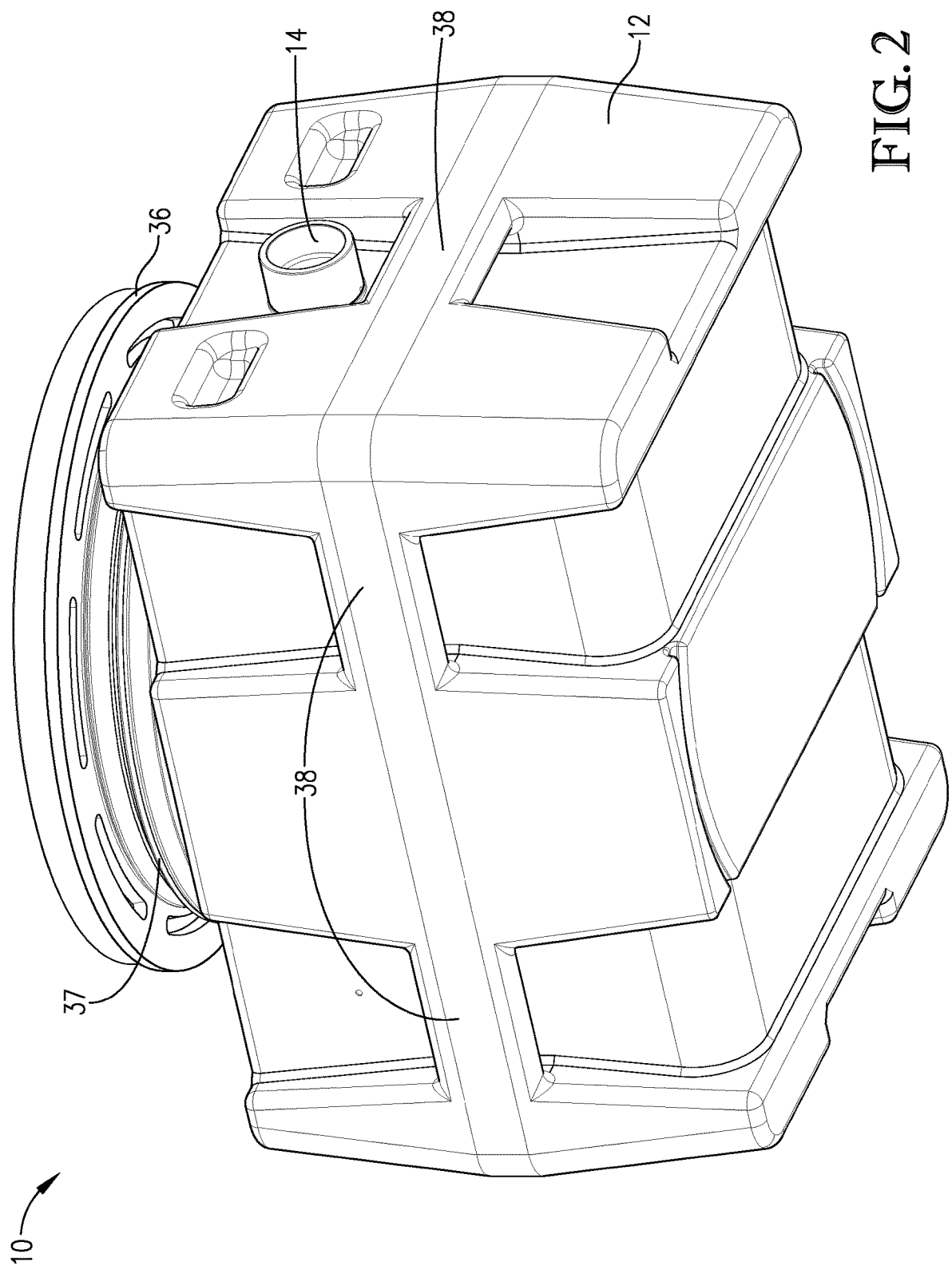
FIG. 2 is a bottom-left-rear perspective view of the solids interceptor shown in FIG. 1.
Figure 3:
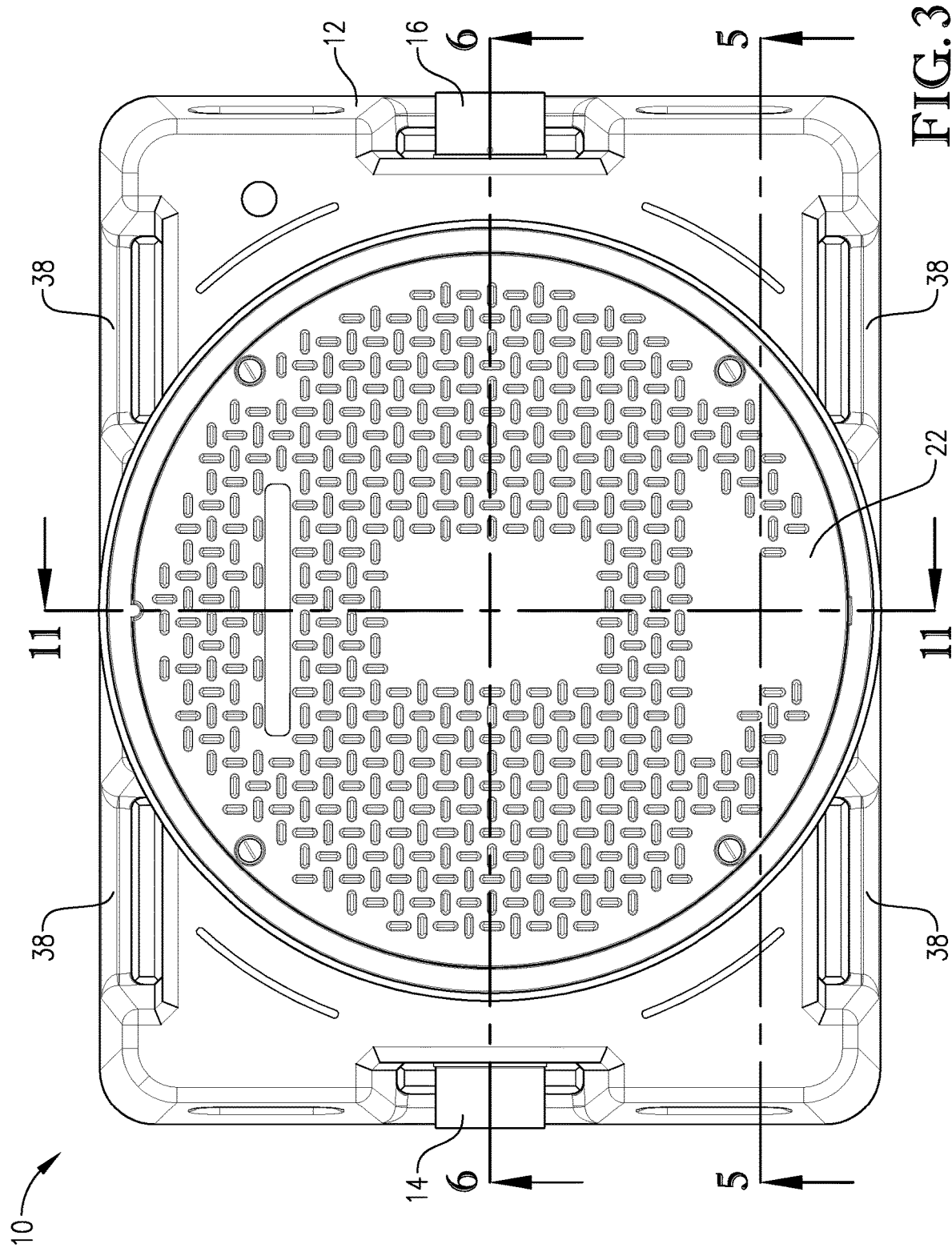
FIG. 3 is a top view of the solids interceptor shown in FIGS. 1-2.

Embodiments of the instant invention will be described in detail with reference to the accompanying figures. FIGS. 1-12 show a solids interceptor 10 according to aspects of the invention. The solids interceptor 10 generally includes a tank 12 having an inlet 14 on an upstream end thereof and an upper outlet 16 and lower outlet 18 on a downstream end of the tank 12. As used throughout this description, "upstream" and "downstream" refer to the general flow of wastewater through the solids interceptor 10, which enters through inlet 14 and exits through one of outlets 16, 18 (which will be discussed in more detail). The "downstream" or "axially" direction, in turn, refers to a horizontal direction generally extending from the inlet 14 to the upper outlet 16, with the "lateral" direction being a horizontal direction perpendicular to the downstream direction.

The tank 12 may be constructed of any suitable material, and in some embodiments is constructed of ⅜-inch thick seamless polyethylene. The inlet 14 and outlets 16, 18 may be sized according specific drain line requirements, and in some embodiments may be schedule 40 plain end pipe having a diameter between 1 inch and 8 inches, and more preferably between 2 inches and 6 inches. In some embodiments, the inlet 14 and outlets 16, 18 may be 2-inch schedule 40 plain end pipe, in other embodiments may be 3-inch schedule 40 plain end pipe, in other embodiments may be 4-inch schedule 40 plain end pipe, and in still other embodiments may by 6-inch schedule 40 plain end pipe.

Figure 4:
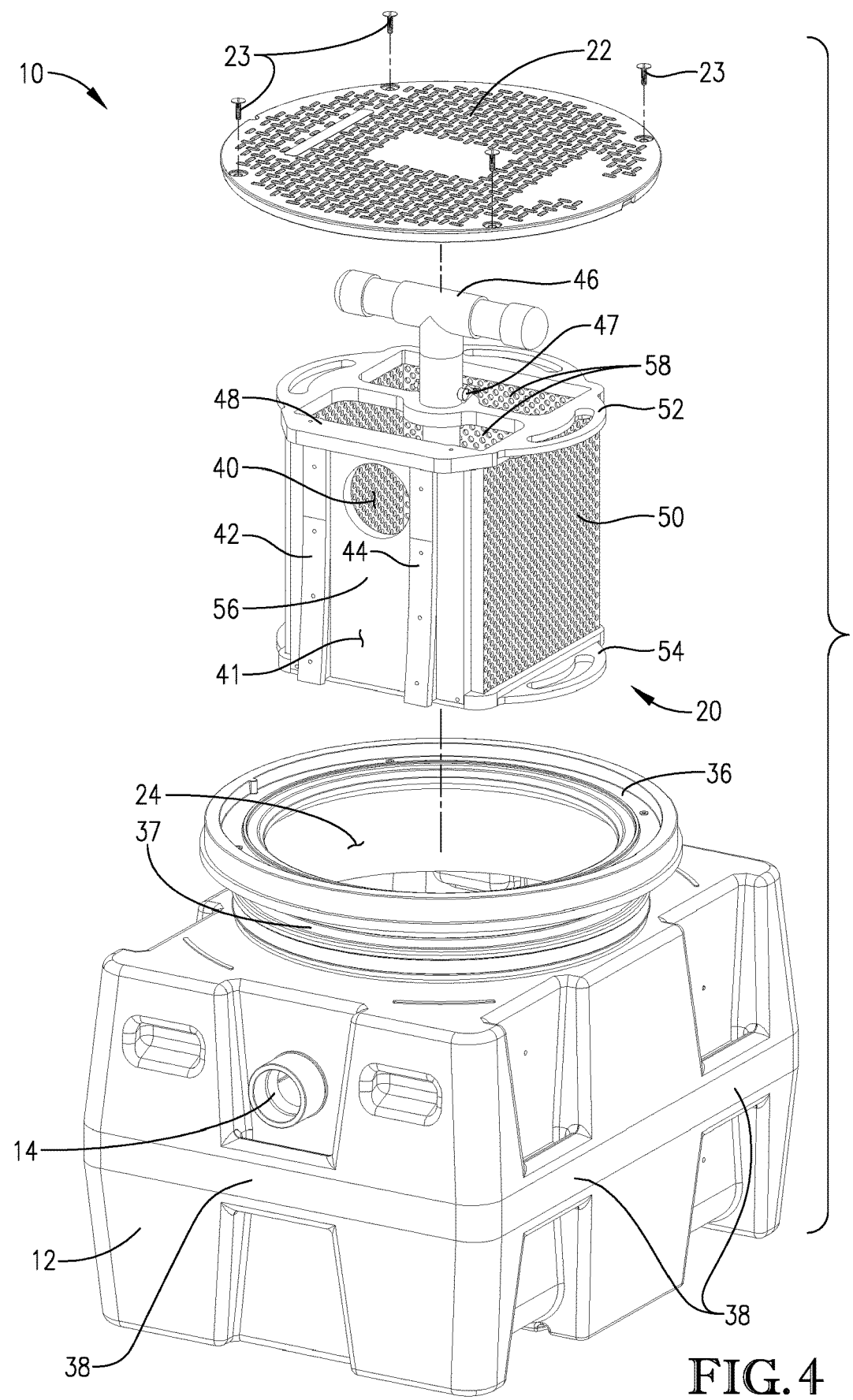
FIG. 4 is a is an exploded view of the solids interceptor shown in FIGS. 1-3, showing a basket and a cover of the solids interceptor removed from the tank.
Figure 5:
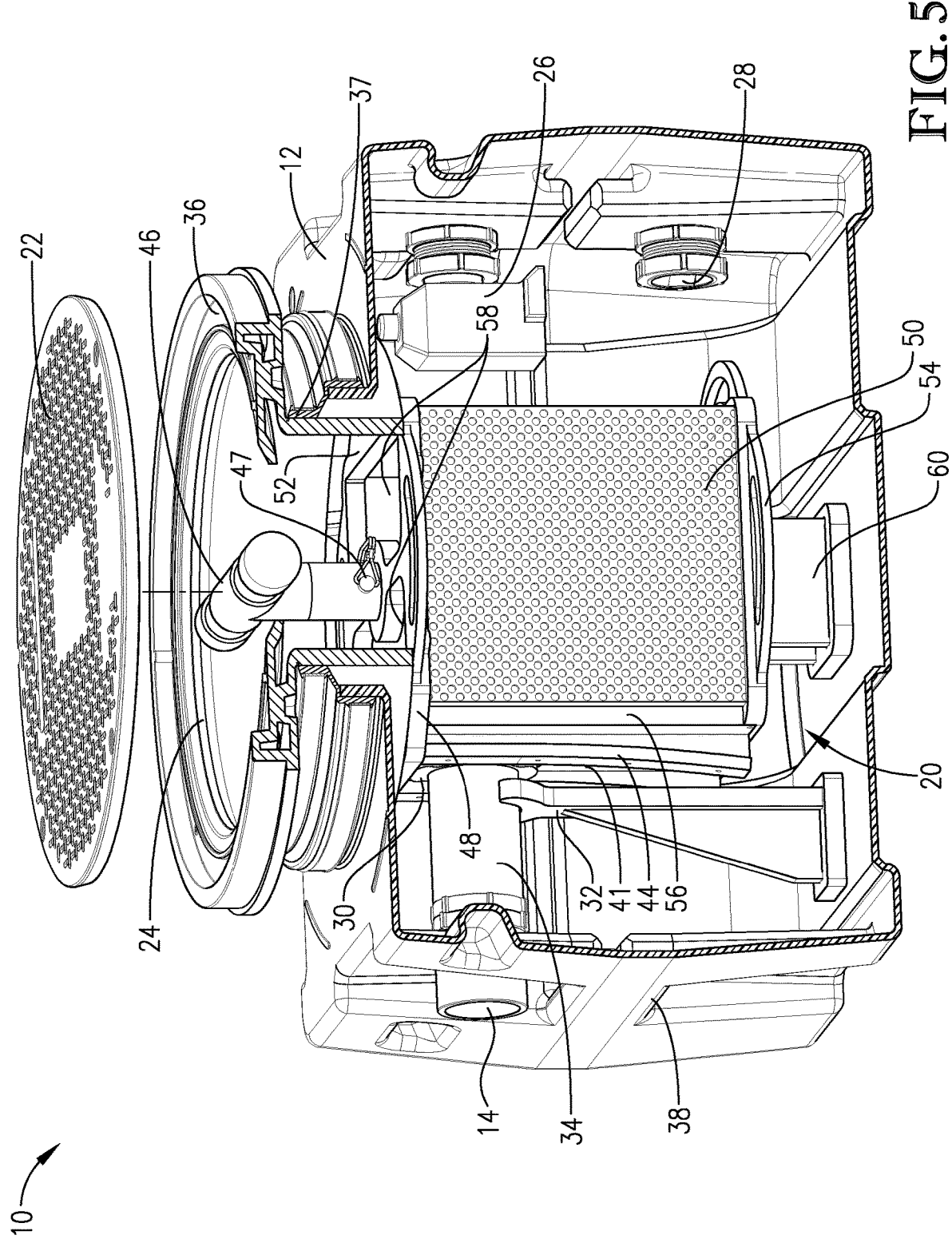
FIG. 5 is a cross-sectional, perspective view of the solids interceptor shown in FIGS. 1-4, viewed along line 5-5 in FIG. 3, including the full cover shown in a removed state.

An access opening 24 is provided on an upper end of the tank 12 through which a perforated basket 20 is inserted and removed during cleaning and maintenance (FIG. 4). A cover 22 seals the access opening 24 by coupling to a cover adapter 36 disposed about the periphery of the access opening 24. In some embodiments, the cover 22 may be fixed by aligning a plurality (e.g., four) through-holes provided on the cover 22 with a corresponding plurality of tapped holes provided on the cover adapter 36, and secured via a plurality (e.g., four) threaded fasteners 23 extending through the through-holes and into the tapped holes.

During use, the solids interceptor 10 may be installed several feet below grade. In such embodiments, the solids interceptor 10 includes a riser 37 extending between a top of the tank and the cover 22 such that the access opening 24 and the cover 22 are located at or near grade to provide easy access to an interior of the solids interceptor 10. In such embodiments, the solids interceptor 10 may include a handle 46 extending vertically from an upper end of the basket 20 (and more particularly, a center support 21 of the basket 20, which will be discussed below) to a location proximate the access opening 24 and cover 22. In this regard, a user accessing the solids interceptor 10 at grade level can remove the cover 22 and access the basket 20 via the handle 46.

At a high level, the solids interceptor 10 is installed along a wastewater drain line to remove solid waste contained in wastewater. The solids interceptor 10 may be used in a facility that includes solid-laden wastewater such as, e.g., a laundry facility, a commercial kitchen, a pet wash or kennel, an art room sink, a barber shop or hair salon, or a food processing facility. The solids interceptor 10 may be placed on the ground (such as, e.g., on a basement floor of the facility) or may be buried below grade. A drain line from the facility is connected to the inlet 14 of the solids interceptor, and to one of the outlets 16 and 18 is connected a pipe that continues to a septic tank, sewer system, or other disposal site. Whichever outlet 16, 18 is used may optionally be outfitted with the sewer gas trap 26 to prevent sewer gasses from entering the facility. The unused outlet 16, 18 is sealed with a watertight cap 28. As solids-laden wastewater leaves the facility via the drain pipe, it enters the tank 12 and flows into the basket 20. The basket 20 filters the wastewater thus collecting the solid waste therefrom, while permitting liquid waste to flow through the basket 20's perforated sides and ultimately out of the tank 12 via one of the outlets 16, 18, where it is then piped to a disposal site. The basket 20 is periodically accessed and removed from the tank 12 via access opening 24 to remove and discard the solid waste collected therein.

The solids interceptor 10 can be sized according to space constraints, required drainage capacity, and/or overhead load capacity, among other considerations. For example, a length of the solids interceptor 10—i.e., a dimension of the solids interceptor 10 in the downstream direction—may be between 15 inches and 60 inches, and more preferably between 25 inches and 46 inches. In some embodiments, the length of the solids interceptor 10 is 25 inches, 33 inches, 37 inches, or 46 inches. A width of the solids interceptor—i.e., a dimension of the solids interceptor 10 in a lateral direction perpendicular to the downstream direction—may be between 10 inches 50 inches, and more preferably between 19 inches and 32 inches. In some embodiments, the width of the solids interceptor 10 is 19 inches, 25 inches, 28 inches, or 32 inches. A height of the solids interceptor may be between 10 and 50 inches, and more preferably between 14¼ inches and 38½ inches. In some embodiments, the height of the solids interceptor 10 is 14¼ inches, 25 inches, 28½ inches, or 38½ inches.

A diameter of the cover 22 of the solids interceptor 10 may be between 10 inches and 30 inches, and more preferably between 16 inches and 24½ inches. In some embodiments, the diameter of the cover 22 is 16 inches, and in other embodiments the diameter of the cover is 24½ inches. The cover may be constructed to withstand an overhead load of between 300 pounds and 20,000 pounds, and more preferably between 450 pounds and 16,000 pounds. For example, a 16-inch cover may result in a cover load capacity of 450 pounds to 2,500 pounds, while a 24½-inch cover may result in a cover load capacity of 2,000 pounds to 16,000 pounds.

Turning now to FIGS. 4-12, the internal structure of the solids interceptor 10 and the basket 20 will be described in more detail. The basket 20 includes an upright frame 48 comprising a top frame member 52, an opposing bottom frame member 54, a vertical frame member 56, and a perforated screen 50. The bottom frame member 54 is generally solid and, when the basket 20 is fully installed within the tank 12, the bottom frame member 54 rests upon a seat 60 provided at a bottom of the tank 12. The top frame member 52 includes one or more openings 58 providing access to an interior of the basket 20 during cleaning. The perforated screen 50 and the vertical frame member 56 extend between the opposing upper frame member 52 and lower frame member 54, and form the peripheral, upstanding walls of the basket 20. The perforated screen 50 extends around a majority of the periphery of the basket 20. For example, in some embodiments the perforated screen 50 extends around approximately 75% of the periphery of the basket 20. More particularly, in some embodiments the basket has a generally square-shaped footprint, and the perforated screen extends along three of the four edges of the square-shaped footprint including the two lateral edges and the downstream edge of the square-shaped footprint.

On an upstream end of the basket 20, the vertical frame member 56 extends between an upstream end of the top frame member 52 and an upstream end of the bottom frame member 54. The vertical frame member 56 is generally solid except for a basket inlet 40, which is a circular opening disposed proximate an upper end of the vertical frame member 56. The basket inlet 40 allows for wastewater carrying solid waste to enter the basket 20 during use.

The perforated screen 50 includes a plurality of perforations sized such that liquid waste can freely flow through the perforations while solid waste remains trapped in the basket. For example, in some embodiments the perforated screen 50 is constructed from a corrosive-resistant material and comprises 0.1-inch×0.08-inch perforations. Because the cumulative cross-sectional area of the perforations provided on the perforated screen 50 is much larger than the cross-sectional area of the basket inlet 40 (for example, in some embodiments the cumulative cross-sectional area of the perforations on the perforated screen 50 is at least nine times greater than the cross-sectional area of the basket inlet 40) liquid waste can easily flow out of the basket 20 even in the presence of collected solid waste therein, reducing the likelihood of a backup.

The vertical frame member 56 also includes a first vertical rib 42 and a second vertical rib 44 that, along with an annular flange 30 provided at a downstream end of an inlet pipe 34, form an interlocking flange assembly. The ribs 42, 44 are laterally spaced from one another with the basket inlet 40 disposed therebetween, and the ribs 42, 44 run parallel to one another along at least the majority of the height of the vertical frame member 56. The ribs 42, 44 are ramped or flared such that, when the basket 20 is fully installed within the tanks 12, the lowermost end of each rib 42, 44 extends further upstream than an uppermost end of each rib 42, 44.

As best seen in FIGS. 8-10 and 12, each rib 42, 44 includes a shoulder 43, 45 extending along the upstream edges of the respective rib 42, 44. Each shoulder 43, 45 protrudes from the respective rib 42, 44 towards the other rib thereby forming an overhang. For example, the shoulder 43 protrudes from rib 42 towards rib 44 such that the shoulder 43 overhangs rib 42 on the side of the rib 42 facing the basket inlet 40, leaving a void between the shoulder 43 and the vertical frame member 56. Similarly, the shoulder 45 protrudes from rib 44 towards rib 42 such that the shoulder 45 overhangs rib 44 on the side of the rib 44 facing the basket inlet 40, leaving a void between the shoulder 45 and the vertical frame member 56. Because the ribs 42, 44 are ramped or flared at the bottom thereof, the spacing or void between the shoulders 43, 45 and the vertical frame member 56 is greatest and the lowermost end of the ribs 42, 44, and gradually decreases in the vertical direction such that the spacing or void between the shoulders 43, 45 and the vertical frame member 56 is the smallest and the uppermost end of the ribs 42, 44.

Together, the vertical frame member 56, ribs 42, 44, and shoulders 43, 45 define a channel 41 configured to slidably receive the annular flange 30 as the basket 20 is removed from the tanks 12 and installed into the tank 12. The annular flange 30 is affixed to a downstream of the inlet pipe 34, which in turn is supported by and held in place by a gusset 32. The thickness of the flange 30 is approximately equal to the depth of the void between the shoulders 43, 45 and the vertical frame member 56 at the narrowest point thereof (i.e., proximate the uppermost end of the ribs 42, 44).

Figure 12:
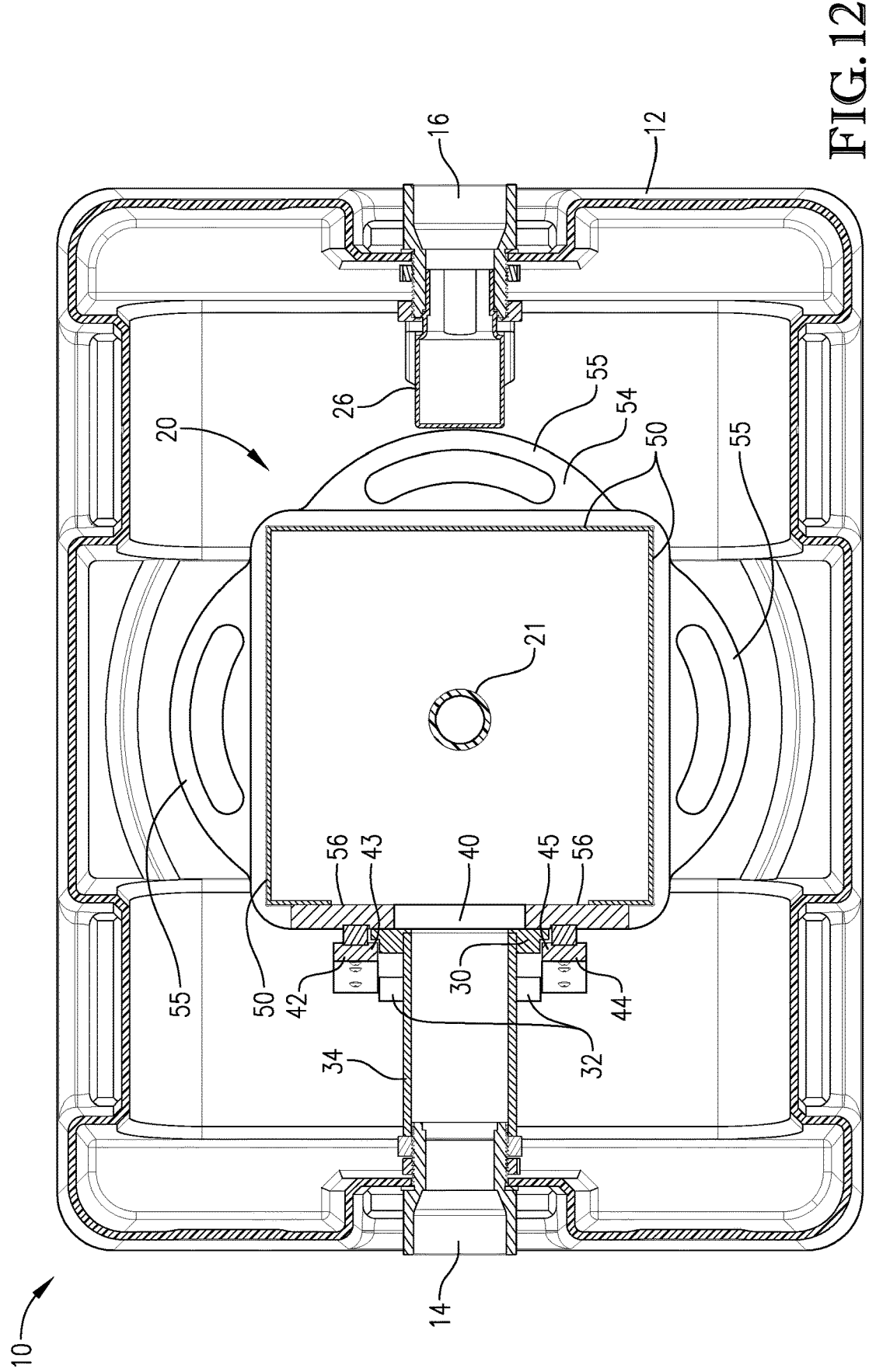
FIG. 12 is a cross-sectional view of the solids interceptor shown in FIGS. 1-11, viewed along line 12-12 in FIG. 6.

During installation of the basket 20 into the tank 12 as the basket 20 is moving in a generally downward direction, the flange 30 slides within the channel 41—that is, between the rib 42 and rib 44 in the lateral direction, and between the shoulders 43, 45 and the vertical guide member 56 in the downstream direction—until the basket 20 engages a seat 60 disposed on the floor of the tank 12 and thus comes to rest. Once the basket is resting on the seat 60, the inlet pipe 34 is axially aligned with the basket inlet 40, with the flange 30 surrounding the periphery of the basket inlet 40. At this position, and as best seen in FIG. 12, the annular flange 30 is held firmly in place against the vertical frame member 56 by the shoulders 43, 45, while being held firmly in place in the lateral direction by the ribs 42, 44.

Moreover, because of the ramp or flared bottom ends of the ribs 42, 44, the channel 41 is deepest at the lowermost end of the ribs 42, 44 and narrowest at the uppermost ends thereof. Thus, the flange 30 easily slides along the channel 41 as the basket 20 first enters the tank and the ribs 42, 44 and shoulders 43, 45 first encounter the flange 30. But the flange 30 meets more resistance as the basket 20 is continually lowered with the flange 30 thus approaching the uppermost end of the ribs 42, 44. At this point, due to the relatively narrow thickness of the channel 41 in the downstream direction, the flange 30 is snugly held in place between the shoulders 43, 45 and the vertical frame member 56, while being snugly held in the lateral direction by the ribs 42, 44 (FIG. 12). In this position the inlet pipe 34 is axially aligned with the basket inlet 40, creating an unobstructed passageway for wastewater to enter the basket 40. In this regard, simply by inserting the basket 20 into the tank 12, the basket 20 becomes "hard-piped" to the inlet pipe 34. Wastewater entering the solids interceptor via inlet 14 and inlet pipe 34 thus enters the basket 20 (via basket inlet 40) and does not escape around the flange 30. In other words, all or substantially all the wastewater entering the tank 12 of solids interceptor 10 via inlet 14 in turn enters the basket 20. Similarly, once the solid waste is collected in the basket 20, the interlocking flange assembly ensures that the solid waste accumulated within the basket 20 cannot otherwise escape to out of the basket 20 and settle on the floor of the tank 12.

In some embodiments the geometry of the frame 48 physically permits the basket 20 to be installed in the tank 12 only in one direction—i.e., when the vertical frame member 56 is facing the upstream end of the tank 12. More particularly, the lower frame member 54 has a generally circular outer periphery except for a portion of the lower frame member 54 abutting the vertical frame member 56. This portion of the lower frame member 54 is truncated to form the lowermost opening of the channel 41. In this regard, if the basket 20 is placed within the tank 12 in an incorrect orientation, the lower frame member 54—and more particularly, the arcuate portions 55 of the lower frame member 54 extending outwardly from the vertical side walls formed by the perforated screen 50 (FIG. 12)—will contact the inlet pipe 34 and/or flange 30 connected thereto, and thus the basket 20 will not fully insert in the tank 12. Only by turning the basket 20 so that the basket 20 is in the appropriate configuration (i.e., such that the vertical frame member 56 is facing the upstream end of the tank 12) will the basket 20 fully insert into the tank 12 with the flange 30 being slidably received within the channel 41. Thus, if a user inadvertently attempts to install the basket 20 in an incorrect orientation (i.e., such that the vertical frame member 56 does not face the upstream end of the tank), the basket 20 will not fully insert into the tank 12 because the bottom frame member 54 will contact the inlet pipe 34 and/or flange 30, alerting the user that the basket 20 is improperly configured. By only physically permitting the basket 20 to be installed in the correct orientation, the frame 48 prevents the basket 20 from being placed within the tank 12 in an incorrect orientation that would otherwise result in the inlet pipe 34 and basket inlet 40 not being axially aligned and thus the wastewater not properly flowing through the basket 20.

Wastewater exits the tank 12 via the upper or lower outlet 16, 18. In the depicted embodiment, the lower outlet 18 is not being used as a wastewater outlet, and thus a watertight cap 28 is placed on the lower outlet 18. The upper outlet 16, which is being used as a wastewater outlet, is optionally fitted with a sewer gas trap 26 that permits liquid waste to flow out of the tank 12 while prohibiting sewer gas from backflowing into the tank 12 (and ultimately the facility). More particularly, the sewer gas trap 26 is an elbow with an inlet thereof extending below a static water line (which will be discussed more fully below). This in turn provides a water seal at the inlet of the sewer gas trap 26, which is a column of water provided between the submerged inlet to the sewer gas trap 26 and the static water line. In some embodiments, a 2-inch column of water is formed at the sewer gas trap 26, prohibiting sewer gases from entering the tank 12 through the outlet 16, 18. The sewer gas trap 26 and watertight cap 28 are interchangeable such that, when the lower outlet 18 is used rather than upper outlet 16, the cap 28 is placed on the upper outlet 16 and the sewer gas trap 26 is placed on the lower outlet 18.

Figure 6:
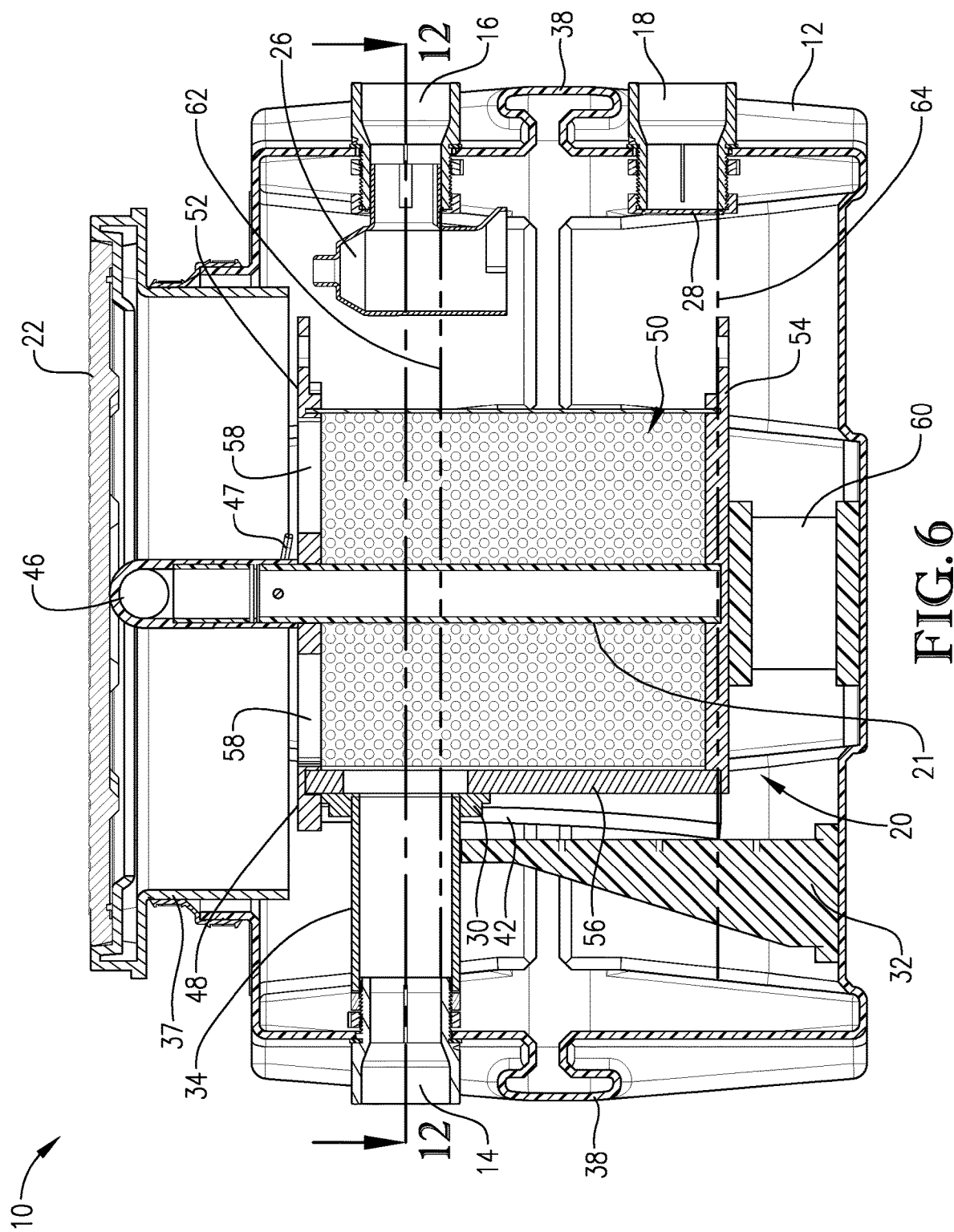
FIG. 6 is a cross-sectional view of the solids interceptor shown in FIGS. 1-5, viewed along line 6-6 in FIG. 3.
Figure 7:
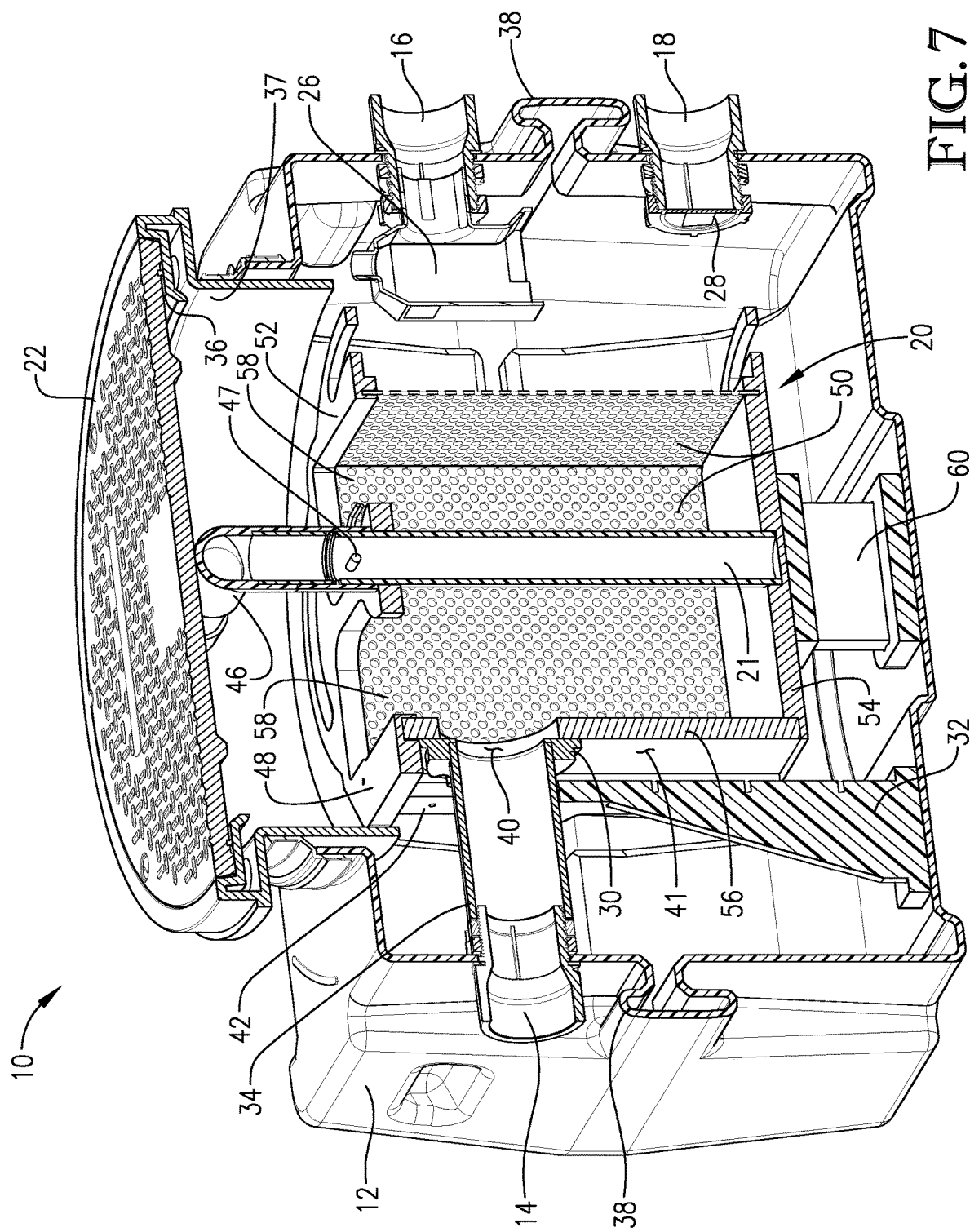
FIG. 7 is a cross-sectional, perspective view of the solids interceptor shown in FIGS. 1-6, viewed along line 6-6 in FIG. 3.
Figure 9:
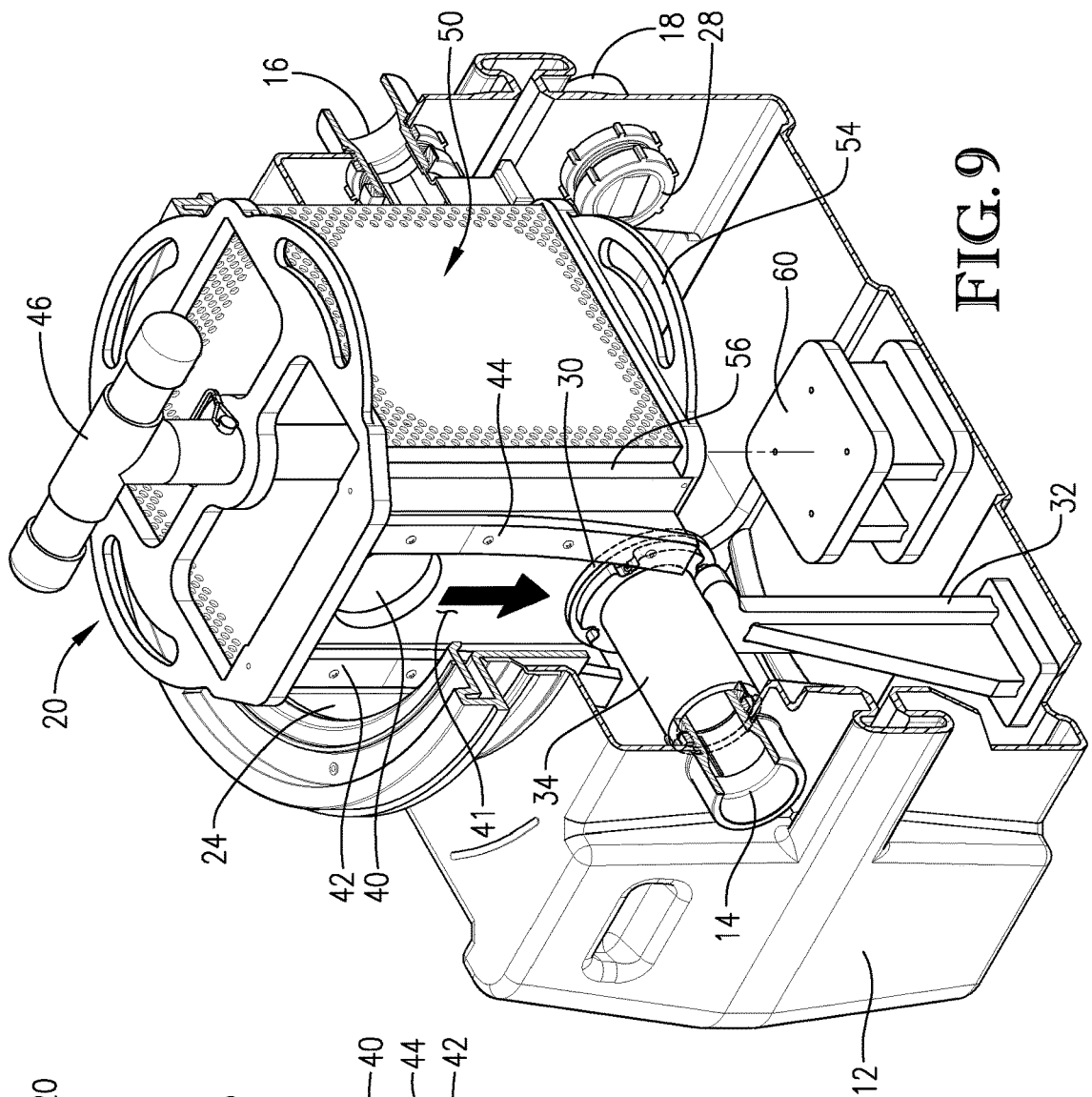
FIG. 9 is a is a top-left-front perspective view of the solids interceptor shown in FIGS. 1-8, shown with various portions of the solids interceptor cutaway and with the basket in a partially removed state.
Figure 8:
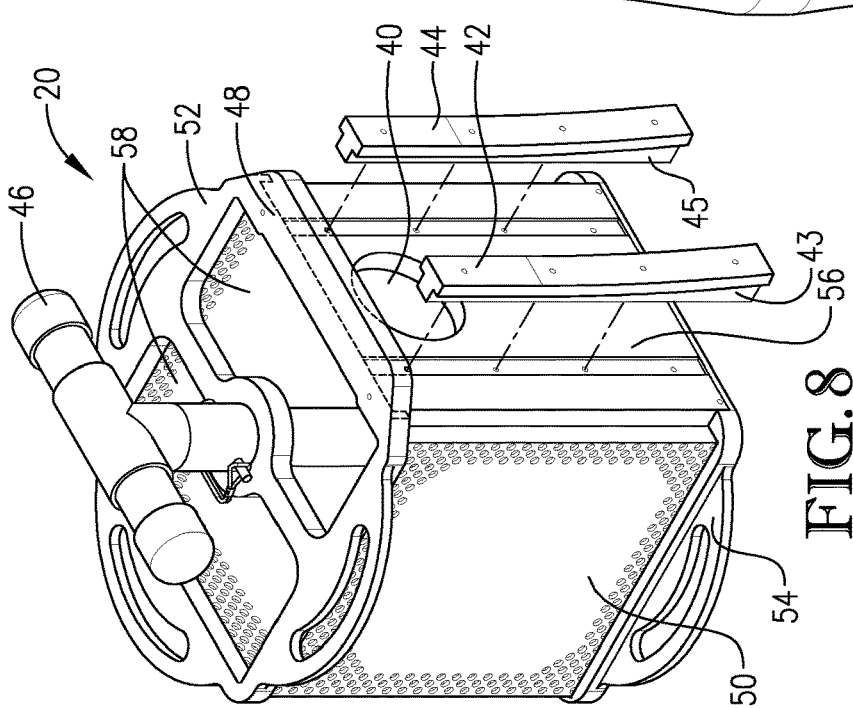
FIG. 8 is top-left-rear perspective view of the basket of the solids interceptor shown in FIGS. 1-7, shown with the ribs and shoulders removed therefrom.
Figure 10:
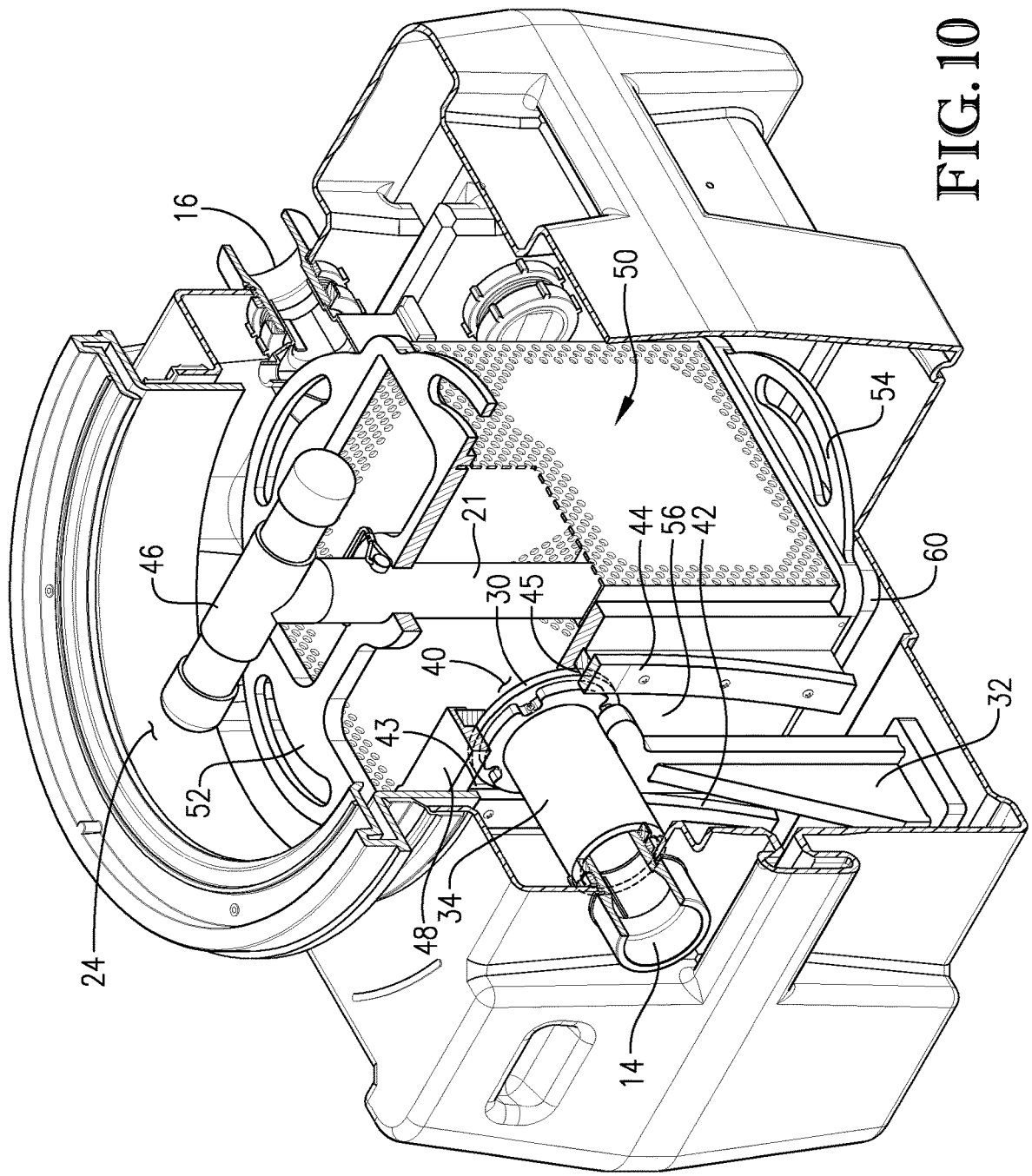
FIG. 10 is a is a top-left-front perspective view of the solids interceptor shown in FIGS. 1-9, shown with various portions of the solids interceptor cutaway and with the basket in a fully installed state.
Figure 11:
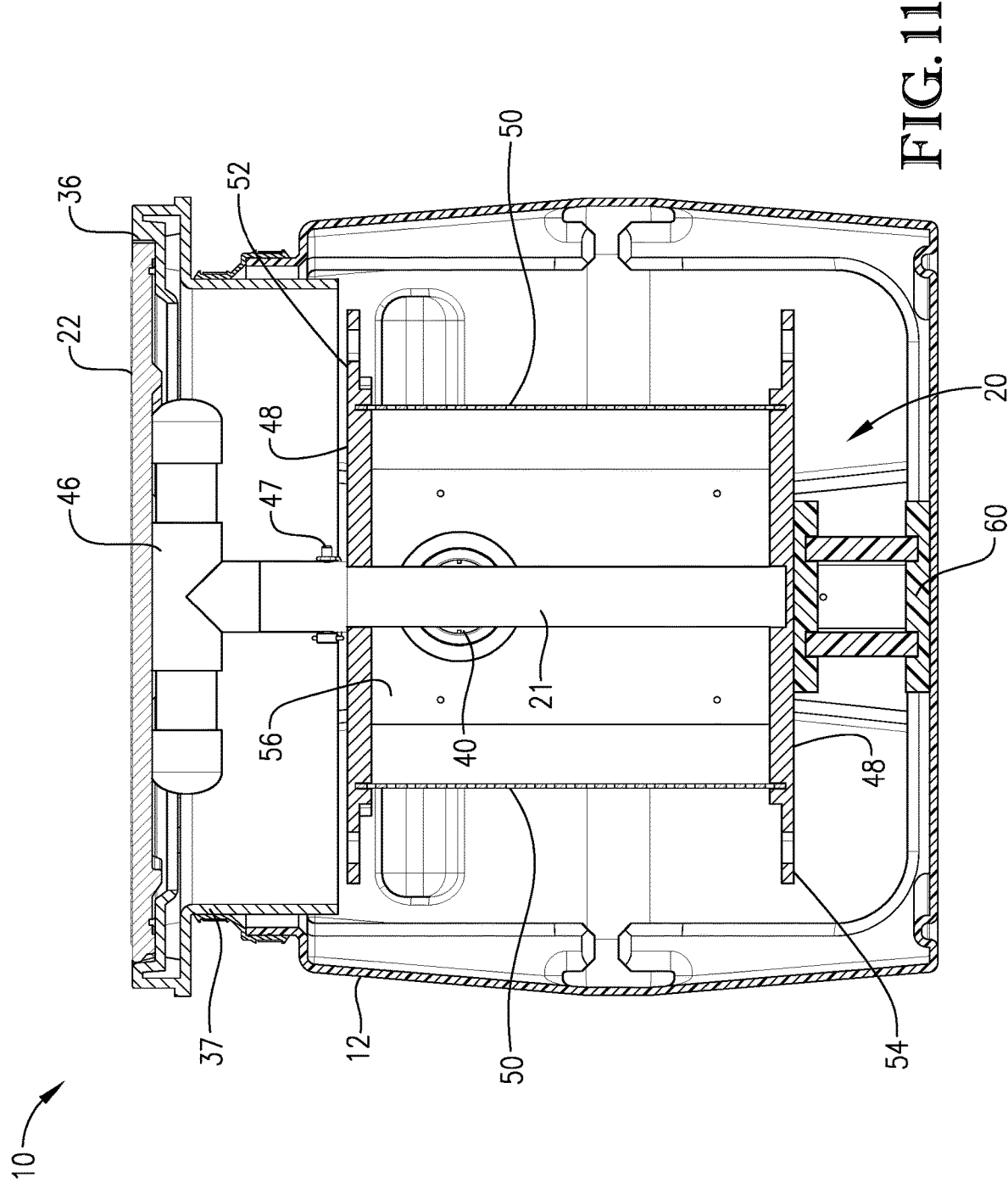
FIG. 11 is a cross-sectional view of the solids interceptor shown in FIGS. 1-10, viewed along line 11-11 in FIG. 3.

As should be appreciated, when the cap 28 is placed on the lower outlet 18 and the sewer gas trap 26 is placed on the upper outlet 16, the tank 12 will have a relatively high static water line. Conversely, when the cap 28 is placed on the upper outlet 16 and the sewer gas trap 26 is placed on the lower outlet 18, the tank 12 will have a relatively low static water line. "Static water line" refers to the level at which water will remain standing within the tank 12 even when no wastewater is actively flowing therethrough. As best seen in FIG. 6, when using the upper outlet 16, water will begin to flow out of the tank 12 once the water level in the tank 12 reaches the lowest portion of the outlet 16. This results in a relatively high static water line 62. In contrast, when using the lower outlet 16, water will begin to flow out of the tank 12 much sooner: once the water reaches the lowest portion of the outlet 18. This results in a relatively low static water line 64.

In some embodiments, the high static water line 62 may be between 5 inches and 30 inches from the bottom of the tank 12, and more preferably between 8¾ inches and 23¾ inches from the bottom of the tank 12. In some embodiments, the low static water line 64 may be between 1 inch and 10 inches from the bottom of the tank 12, and more preferably between 2⅞ inches and 7¾ inches from the bottom of the tank 12.

For example, in one embodiment the tank 12 is 25 inches long and 19 inches wide, the upper outlet 16 is a 2-inch schedule 40 pipe having a centerline 10 inches from the bottom of the tank 12, and the lower outlet 18 is 2-inch schedule 40 pipe having a centerline 4 inches from the bottom of the tank 12. This results in a high static water line 62 of 8¾ inches equating to approximately 15 gallons of standing water, and a low static water line 64 of 2⅞ inches equating to approximately 4 gallons of standing water. In another embodiment, the tank 12 is 33 inches long and 25 inches wide, the upper outlet 16 is a 3-inch schedule 40 pipe having a centerline 15 inches from the bottom of the tank 12, and the lower outlet 18 is 3-inch schedule 40 pipe having a centerline 6 inches from the bottom of the tank 12. This results in a high static water line 62 of 13¼ inches equating to approximately 35 gallons of standing water, and a low static water line 64 of 4¼ inches equating to approximately 12 gallons of standing water. In another embodiment, the tank 12 is 37 inches long and 28 inches wide, the upper outlet 16 is a 4-inch schedule 40 pipe having a centerline 18 inches from the bottom of the tank 12, and the lower outlet 18 is a 4-inch schedule 40 pipe having a centerline 6½ inches from the bottom of the tank 12. This results in a high static water line 62 of 15¾ inches equating to approximately 52 gallons of standing water, and a low static water line 64 of 4¼ inches equating to approximately 14 gallons of standing water. And in still another embodiment, the tank 12 is 46 inches long and 32 inches wide, the upper outlet 16 is a 4-inch schedule 40 pipe having a centerline 26 inches from the bottom of the tank 12, and the lower outlet 18 is 4-inch schedule 40 pipe having a centerline 10 inches from the bottom of the tank 12. This results in a high static water line 62 of 23¾ inches equating to approximately 110 gallons of standing water, and a low static water line 64 of 7¾ inches equating to approximately 30 gallons of standing water.

In some embodiments, the basket includes a handle 46 detachably fixed thereto. In many installations, the solids interceptor 10 may be installed below grade, such as, for example, six feet below ground. In such installations, it may be difficult to otherwise reach the basket 20 installed within tank 12. Thus, for such embodiments a T-shaped handle 46 is detachably affixed to an upper portion of the basket 20, which enables a user to easily remove and replace the basket 20 notwithstanding the deeply buried tank 12.

The handle 46 is detachably affixed to the upper end of the basket 20—and more particularly to a center support 21 disposed in a center of the basket 20 (FIGS. 6, 10-12)—via a lock pin 47. In such embodiments, a riser 37 is affixed to the the top of the tank 12, with the cover adapter 36 and cover 22 attached to the top of the riser 37, near grade. During maintenance (i.e., when removing the basket 20 to clean the contents therefrom), the cover 22 can be removed at grade level, and the T-shaped portion of the handle 46 will be just below the exposed access opening 24. The user can thus grasp the handle 46 and lift, which in turn removes the basket 20 from the interior of the tank 12. Once the basket 20 is brought above grade, the handle 46 can be detached from the basket 20 by removing the pin 47 and sliding the handle 46 off the center support 21 and away from the basket 20. This allows for the basket 20 to be easily emptied by dumping the contents of the basket 20 into a trash can without interference by the handle 46.

Once all solid waste has been removed from the basket 20, the handle 46 (if equipped) is slid back onto the center support 21 of the basket 20 such that through-holes within the lower portion of the handle 46 align with through-holes provided in the center support 21. The locking pin 47 is then placed through the through-holes, thus removably coupling the handle 46 to the basket 20. The basket 20 in then reinstalled in the tank 12 simply by lowering the basket 20 into the tank 12 via the access opening 24. As discussed, this simple act of lowering the basket 20 into the tank 12 "hard-pipes" the basket 20 to the inlet pipe 34 via the interlocking coupling formed by the flange 30, vertical frame member 56, ribs 42, 44, and shoulders 43, 45. More particularly, the basket 20 is lowered into the tank 12 such that the vertical frame member 56 and ribs 42, 44 face the inlet pipe 34 and flange 30. As the basket 20 is lowered, the annular flange 30 is slidably received with the channel 41. Once the basket 20 is lowered all the way into the tank 12 and is resting on seat 60, the flange 30 will in turn be snugly received between the shoulders 43, 45 and the vertical frame member 56 in the downstream direction and between the ribs 42, 44 in the lateral direction, with the inlet pipe 34 being axially aligned with the basket inlet 40.

In use, solids-laden wastewater from the facility will flow through the main drain line and into the tank 12 via inlet 14. The solids-laden wastewater then passes through the inlet pipe 34 and through the basket inlet 40, into an interior of the basket 20. Here, the solid waste contained in the wastewater will become trapped while the liquid waste will pass through the perforated screen 50 and ultimately exit the tank 12 via the outlet 16 or 18 and continue to a septic tank, sewer system, or the like.

Because the solid waste contained within the wastewater becomes trapped within the interior of the basket 20, the basket 20 will eventually fill with solid waste. In some embodiments, the basket 20 is configured to hold between 1 gallon and 15 gallons of solid waste, and more preferably between 2 gallons and 10 gallons of solid waste. In some embodiments, the basket 20 is sized and configured to hold 2 gallons of solid waste, in other embodiments the basket 20 is sized and configured to hold 6 gallons of solid waste, in other embodiments the basket 20 is sized and configured to hold 8 gallons of solid waste, and in still other embodiments the basket 20 is sized and configured to hold 10 gallons of solid waste. When the accumulated solid waste is nearing the capacity of the basket 20, the basket 20 is removed from the tank 12 and emptied. A user may do so my removing the cover 22 (by, e.g., removing the plurality of threaded fasteners and lifting) and then lifting the basket 20 out of the tank 12 via the access opening 24. When the solids interceptor 10 is installed above or near grade, the user may simply grasp the top frame member 52 and lift. But when the solids interceptor is installed further below grade, the top frame member 52 may not readily accessible and the handle 46 may be used. In such embodiments, the user grasps the handle 46 (the T-junction of which is disposed very near the cover adapter 36) and pulls up.

Either way, pulling up on the basket 20 unseats the annular flange 30 from the channel 41 where it was held snugly around the basket inlet 40. The basket 20 is then lifted out of the tank 12 and the solid waste inside can be discarded. If equipped, the handle 46 can be detached from the basket 20 (by first removing the pin 47 and then sliding the handle 46 away from the center support 21) to ease cleaning out the basket 20.

Once the solid waste is removed, the handle 46 is reinstalled (if equipped) by sliding the handle 46 onto the center support 21 of the basket 20 and replacing the pin 47. The basket 20 is reinserted into the tank 12 as described above. The cover 22 is then placed over the access opening 24 and secured to the cover adapter 36 via threaded fasteners or the like.

A method of installing the solids interceptors 10 will now be discussed in detail. The solids interceptor 10 is installed along a facility's drainage system such as along a utility sink's drain line where solids are regularly disposed, or along the main drain line of a commercial facility. To install the solids interceptor 10, the drain line is first accessed, which may or may not be located below grade. The solids interceptor 10 is in turn placed in line with the drain line such that wastewater will flow through the tank 12 of solids interceptor 10. Optionally, once in place (i.e., either sitting on the ground or when placed below grade) the solids interceptor 10 can be anchored in place via one or more anchor tie-down points 38. A steel anchor or the like attaches to the anchor tie-down point 38 as well as to the ground to keep the solids interceptor 10 squarely in place notwithstanding surges of water flowing into the tank 12.

The drain line exiting the facility is coupled to the upstream end of the solids interceptor 10 and, more particularly, to the inlet 14 of the tank 12. The drain line is coupled to the inlet 14 using any well-known technique in the art. A pipe leading to a disposal site—such as, e.g., a septic tank, sewer system, a wastewater treatment facility, or other disposal site—is coupled to one of the outlets 16, 18.

The appropriate outlet 16, 18 is chosen based on the architecture of the drainage system and/or based on the specific application of the solids interceptor 10. In embodiments where a drain pipe leading from a facility and a pipe leading to the disposal site are already in place and provided generally at a same vertical elevation, outlet 16 may be used, which is roughly at the same vertical elevation as the inlet 14. In such embodiments, the solids interceptor 10 may simply be patched into an existing, generally horizontal drain line by removing a section of pipe approximately the length of the solids interceptor 10 and then coupling the inlet 14 and outlet 16 to the exposed open ends of the drain line using conventional means. In this embodiment, it may be desirable for the inlet 14 and outlet of the solids interceptor 10 to be at the same general vertical elevation, and thus outlet 16 can be used.

However, in other embodiments it may be beneficial to use the lower outlet 18 to achieve a lower static water line within the tank 12, such as static water line 62 shown in FIG. 6. More particularly, for facilities where there may be a periodic surge of wastewater, it may be desirable to use the lower outlet 18. The lower static water line 64 provided by the lower outlet 18 provides the tank 12 with a larger unused volume, which in turn can absorb a surge of water without any wastewater backing up into the drain line. For example, laundry facilities may have periodic surges of large volumes of water due to washing machines draining at the end of a wash cycle. In such applications, the lower outlet 18 may be utilized to lower the static water line and in turn increase the unused static volume of the tank 12. In other embodiments, it may be desirable to have low amounts of standing water within the tank 12 to easily perform maintenance within an interior of the tank 12. For such embodiments, the lower outlet 18 is chosen resulting in a low static water line 62 and minimal standing water.

Once the appropriate outlet 16, 18 is chosen for the particular drainage system architecture and/or the particular application, the watertight cap 28 is coupled to the unused outlet to prevent water from leaving the unused outlet. In some embodiments, the watertight cap 28 may be threaded onto the unused outlet. The used outlet—i.e., the outlet coupled to the pipe leading to a septic or sewer system—is fitted with a sewer gas trap 26. The sewer gas trap 26 may similarly be threaded onto the used outlet.

The solids interceptor 10 may be provided from the factory in a default setup, such as with the sewer gas trap 26 provided on the upper outlet 16 and the watertight cap 28 provided on the lower outlet 18. In such embodiments, if the upper outlet 16 is in turn coupled to the pipe leading to the disposal site, no further actions are necessary because the trap 26 and cap 28 are already properly configured. However, if the lower outlet 18 is to be used, the trap 26 and cap 28 may be switched by simply unthreading the trap 26 and cap 28 from the outlets 16 and 18, respectively, and then threading the cap 28 on the outlet 16 and the trap 26 on outlet 18.

If necessary, a riser 37 can be installed on the top of the solids interceptor 10, extending the access opening 24 vertically to grade. As discussed, the riser 37 allows for easier access to the interior of the solids interceptor 10 because the cover adapter 36 and cover 22 will in turn be at the grade level. Although the riser 37 depicted in the figures is relatively short, in other embodiments the riser can extend vertically several feet. For example, in some embodiments the riser 37 may be between 1 inch and 90 inches, and more preferably between 2⅛ inches and 72 inches. During installation, the riser 37 may be cut to the desired depth and coupled to the solids interceptor 10 using conventional means. The cover adapter 36 is then coupled to the open upper end of the riser 37, with the cover 22 thereafter attached to the cover adapter 36 using, e.g., threaded fasteners 23 or the like.

For embodiments employing the handle 46, the handle 46 may be appropriately selected and/or sized during installation. For example, a user may be provided with a plurality of handle 46 lengths, and in turn selects the handle 46 most appropriately configured for the depth of the solids interceptor 10 below grade and/or the chosen length of the riser 37. In other embodiments, a user can simply cut a piece of pipe or the like (such as, e.g., polyvinyl chloride (PVC) pipe) to a desired length, and then couple the T-junction of the handle 46 to a proximal end of the cut-to-length pipe using conventional means, and drill through-holes in the distal end, which will in turn receive the pin 47. The cut-to-length handle 46 is then removably affixed to the center support 21 of the basket 20 via the pin 47, as discussed.

Finally, the basket 20—and handle 46 attached thereto, if equipped—is lowered into the tank 12 via the access opening 24, which in turn rests on seat 60 and slidably receives the annular flange 30 in channel 41 and thus axially aligns the inlet pipe 34 with the basket inlet 40, as discussed. This routes wastewater traveling through the drain line and entering the solids interceptor 10 into an interior of the basket 20, with the solid waste in turn being separated from the liquid waste, as discussed. The cover 22 is then placed over the access opening 24 and, optionally, secured to the cover adapter 36 using, e.g., a plurality of threaded fasteners.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

We claim:

1. A solids interceptor for separating solid waste from wastewater, the solids interceptor comprising:
   a tank including:
      an inlet provided on an upstream end of the tank;
      an inlet pipe extending downstream from the inlet and including an annular flange disposed at a downstream end of the inlet pipe;
      a first outlet provided on a downstream end of the tank; and
      an access opening provided on an upper end of the tank; and
   a basket removably received within the tank via the access opening, the basket including:
      an upper frame member and an opposing lower frame member;
      a perforated screen extending between the upper frame member and the lower frame member; and
      a vertical frame member extending between an upstream end of the top frame member and an upstream end of the bottom frame member and including a basket inlet;
   wherein, when the basket is removably received within the tank, the vertical frame member faces the upstream end of the tank, the basket inlet is axially aligned with the inlet pipe, the annular flange abuts the vertical frame member and surrounds the basket inlet, and the basket is configured to receive wastewater flowing into the tank via the inlet and separate solid waste therefrom, and to permit liquid waste to exit the basket via the perforated screen and continue to the first outlet.

2. The solids interceptor of claim 1, wherein the vertical frame member includes a first rib and a second rib, the first and second rib being parallel to one another with the basket inlet provided therebetween, and wherein, when the basket is removably received with the tank, the annular flange is held between the first rib and the second rib.

3. The solids interceptor of claim 2, wherein the vertical frame member includes a first shoulder and a second shoulder, the first and second shoulder being disposed on an upstream edge of the first and second rib, respectively, each overhanging the respective rib forming a spacing between the respective shoulder and the vertical frame member, wherein, when the basket is removably received within the tank, the annular flange is held between the first and second shoulders and the vertical frame member.

4. The solids interceptor of claim 1, wherein the tank includes a second outlet, a sewer gas trap, and a watertight cap, wherein the sewer gas trap is removably coupled to the first outlet, and wherein the watertight cap is removably coupled to the second outlet.

5. A method of separating solid waste from the wastewater, the method comprising:
providing a solids interceptor along a drain line configured to carry wastewater, the solids interceptor comprising:
a tank including an inlet provided on an upstream end of the tank, an inlet pipe extending downstream from the inlet and including an annular flange disposed at a downstream end of the inlet pipe, a first outlet provided on a downstream end of the tank, and an access opening provided on an upper end of the tank; and
a basket removably received within the tank via the access opening, the basket including an upper frame member, an opposing lower frame member, and a perforated screen extending between the upper frame member and the lower frame member, and a vertical frame member extending between an upstream end of the top frame member and an upstream end of the bottom frame member and including a basket inlet;
aligning the basket with the inlet pipe by inserting the basket into the tank via the access opening with the vertical frame member facing the upstream end of the tank, wherein inserting the basket into the tank causes the inlet pipe and the basket inlet to axially align with the annular flange abutting the vertical frame member and surrounding the basket inlet and separating solid waste from the wastewater by draining the wastewater into the tank and the basket via the inlet, and collecting the solid waste in the basket by running the wastewater through the perforated screen thereby permitting only liquid waste to continue to the first outlet.

6. The method of claim 5, wherein the vertical frame member includes a first rib and a second rib, the first and second rib being parallel to one another with the basket inlet provided therebetween, and wherein, when the inlet pipe is axially aligned with the basket inlet, the annular flange is held between the first rib and the second rib.

7. The method of claim 6, wherein the vertical frame member includes a first shoulder and a second shoulder, the first and second shoulder being disposed on an upstream edge of the first and second rib, respectively, each overhanging the respective rib forming a spacing between the respective shoulder and the vertical frame member, and wherein axially aligning the inlet pipe with the basket inlet includes placing the annular flange so that it is held between the first and second shoulders and the vertical frame member.

8. The method of claim 5 further comprising:
removing the basket from the tank via the access opening;
emptying accumulated solid waste from basket; and
replacing the basket in the tank via the access opening.

9. The method of claim 8, wherein the basket includes a handle removably coupled to an upper end of the basket, the method further comprising:
detaching the handle from the basket prior to emptying the accumulated solid waste from basket; and
attaching the handle to the basket prior to replacing the basket in the tank.

10. The method of claim 5, wherein the tank includes a second outlet, a sewer gas trap, and a watertight cap, the method further comprising:
removably coupling the sewer gas trap to the first outlet; and
removably coupling the watertight cap to the second outlet.

11. A method of installing a solids interceptor used to separate solid waste from wastewater, the method comprising:
providing a solids interceptor comprising:
a tank including an inlet provided on an upstream end of the tank, an inlet pipe extending downstream of the inlet, a first outlet provided on a downstream end of the tank, a second outlet provided on the downstream end of the tank below the first outlet and an access opening provided on an upper end of the tank; and
a basket removably received within the tank via the access opening, the basket including an upper frame member, an opposing lower frame member, a vertical frame member extending between an upstream end of the upper frame member and an upstream end of the lower frame member, the vertical frame member including a basket inlet, and a perforated screen extending between the upper frame member and the lower frame member;
fluidly coupling the solids interceptor to a drain line by coupling a first pipe of the drain line to the inlet of the tank, the first pipe being a pipe configured to drain wastewater from a facility;
placing the basket within the tank through the access opening such that the vertical frame member faces the inlet pipe and such that the basket inlet is axially aligned with the inlet pipe;
selecting one of the first outlet and the second outlet for piping liquid waste to a disposal site;
removably coupling a sewer gas trap to the selected one of the first outlet and the second outlet;
removably coupling a watertight cap to the non-selected one of the first outlet and the second outlet; and
coupling a second pipe of the drain line to the selected one of the first outlet and the second outlet, the second pipe configured to carry liquid waste to the disposal site.

12. The method of claim 11 further comprising:
burying the solids interceptor below grade; and
coupling a riser to a top of the tank, the riser extending from the tank to grade.

13. The method of claim 12, wherein the basket further comprises a center support, the method further comprising removably attaching a handle to the center support with a removable pin.

14. The method of claim 13 further comprising cutting the handle to length so that, when the handle is removably coupled to the center support and the basket is placed within the tank, a top of the handle is proximate an opening at an upper end of the riser.

15. The method of claim 14 further comprising removably securing a cover to the opening at the upper end of the riser.

\* \* \* \* \*